(12) United States Patent
Sumi

(10) Patent No.: US 12,261,559 B2
(45) Date of Patent: Mar. 25, 2025

(54) MOTOR CONTROL DEVICE

(71) Applicant: DENSO CORPORATION, Kariya (JP)

(72) Inventor: Tomoaki Sumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 191 days.

(21) Appl. No.: 18/065,706

(22) Filed: Dec. 14, 2022

(65) Prior Publication Data

US 2023/0114838 A1  Apr. 13, 2023

Related U.S. Application Data

(63) Continuation of application No. PCT/JP2021/026503, filed on Jul. 14, 2021.

(30) Foreign Application Priority Data

Aug. 3, 2020 (JP) .................. 2020-131926

(51) Int. Cl.
*H02P 27/08* (2006.01)
(52) U.S. Cl.
CPC .................. *H02P 27/085* (2013.01)
(58) Field of Classification Search
CPC .................................................. H02P 27/085
USPC ....................................................... 318/503
See application file for complete search history.

(56) References Cited

U.S. PATENT DOCUMENTS

| 9,667,185 B2 | 5/2017 | Joachimsmeyer et al. |
| 2014/0067241 A1* | 3/2014 | Yuhara ............... F02N 11/0825 701/112 |
| 2014/0375243 A1* | 12/2014 | Kira ..................... G05B 11/06 318/566 |
| 2016/0099669 A1* | 4/2016 | Joachimsmeyer ....... H02P 7/285 318/459 |

FOREIGN PATENT DOCUMENTS

| JP | 59148585 A | 8/1984 |
| JP | 2001092501 A | 4/2001 |
| WO | 2013088832 A1 | 6/2013 |

OTHER PUBLICATIONS

By Naganami et al. (JP 59148585 A) Control Circuit for Power Converter Date Published Aug. 25, 1984 (Year: 1984).*
Nukushina (WO 2013088832 A1)Motor Drive Device Date Published Jun. 20, 2013 (Year: 2013).*

* cited by examiner

*Primary Examiner* — Jorge L Carrasquillo
(74) *Attorney, Agent, or Firm* — Posz Law Group, PLC

(57) ABSTRACT

A motor control device executes fluctuation suppression control when a power supply voltage for driving a motor supplied from a power supply temporarily decreases and then increases to a normal power supply voltage after recovery. The fluctuation suppression control suppresses fluctuation in a rotation speed of the motor which is caused by following fluctuation in the power supply voltage.

7 Claims, 5 Drawing Sheets

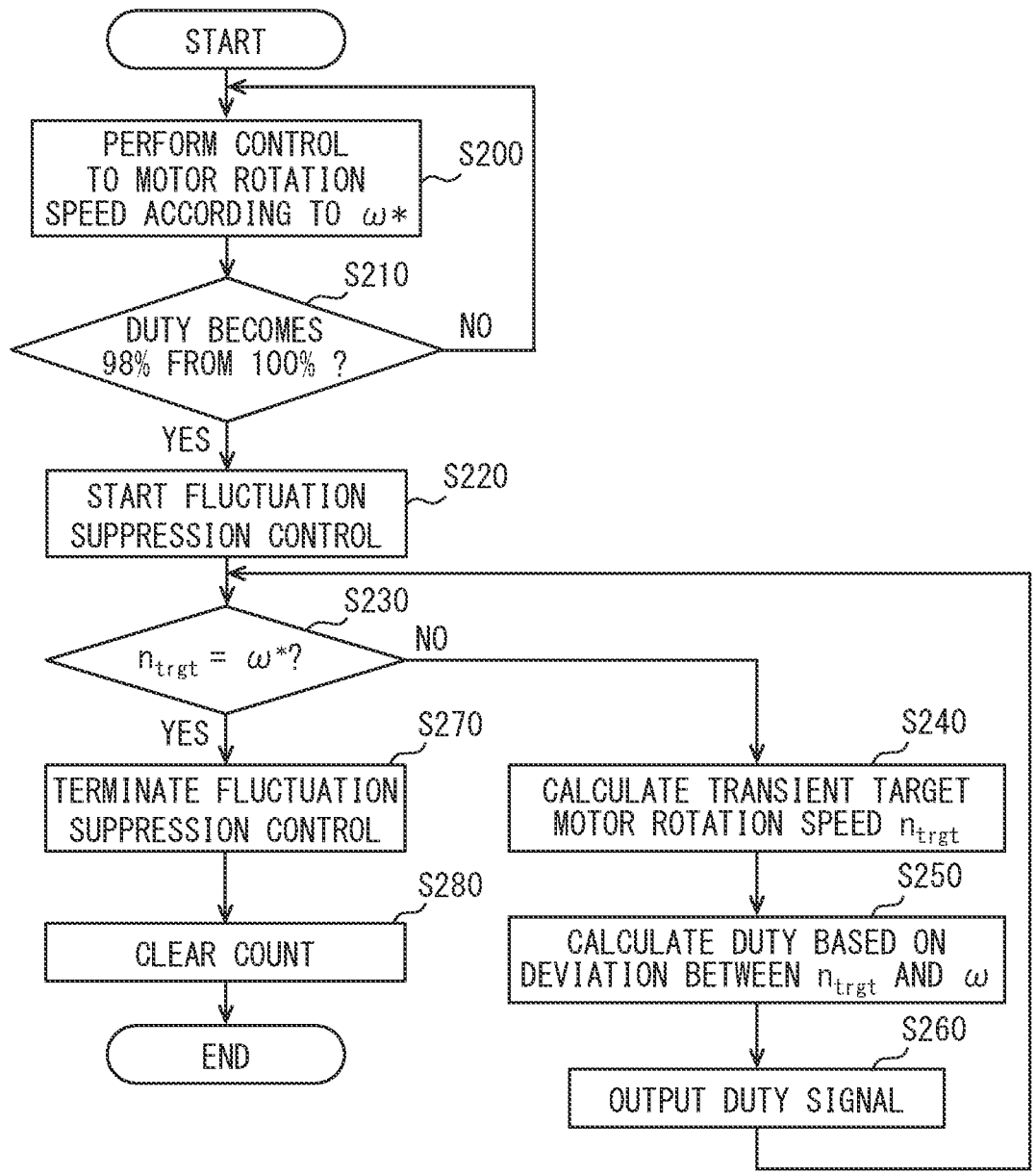

MOTOR CONTROL DEVICE

CROSS REFERENCE TO RELATED APPLICATIONS

The present application is a continuation application of International Patent Application No. PCT/JP2021/026503 filed on Jul. 14, 2021, which designated the U.S. and claims the benefit of priority from Japanese Patent Application No. 2020-131926 filed on Aug. 3, 2020. The entire disclosures of all of the above applications are incorporated herein by reference.

TECHNICAL FIELD

The present disclosure relates to a motor control device that executes fluctuation suppression control that suppresses fluctuation in a rotation speed of a motor which is caused by following fluctuation in a power supply voltage for driving the motor supplied from a power supply when the power supply voltage temporarily decreases and then increases to return to a normal power supply voltage.

BACKGROUND

For example, a method for operating an electric fan of a vehicle has been proposed. According to an exemplary operating method, when a drive voltage of a motor that rotates the electric fan fluctuates (decreases), the motor speed is adjusted to a speed that is lower than a speed when there is no voltage fluctuation. This low speed is maintained until the drive voltage returns from the drop. Then, after a predetermined time has passed since the drive voltage is returned to a certain level, the speed is continuously and linearly increased from the low speed to the original speed.

SUMMARY

The present disclosure provides a motor control device that executes fluctuation suppression control when a power supply voltage for driving a motor supplied from a power supply temporarily decreases and then increases to a normal power supply voltage after recovery. The fluctuation suppression control suppresses fluctuation in a rotation speed of the motor which is caused by following fluctuation in the power supply voltage.

BRIEF DESCRIPTION OF DRAWINGS

The features and advantages of the present disclosure will become more apparent from the following detailed description made with reference to the accompanying drawings. In the drawings:

FIG. 8 is a flowchart showing processing details of variation suppression control that is performed by the motor control device according to the second embodiment, and suppresses fluctuation, by following fluctuation in the power supply voltage $V_{DC}$, in the rotation speed of a three-phase motor.

DETAILED DESCRIPTION

Figure 1:
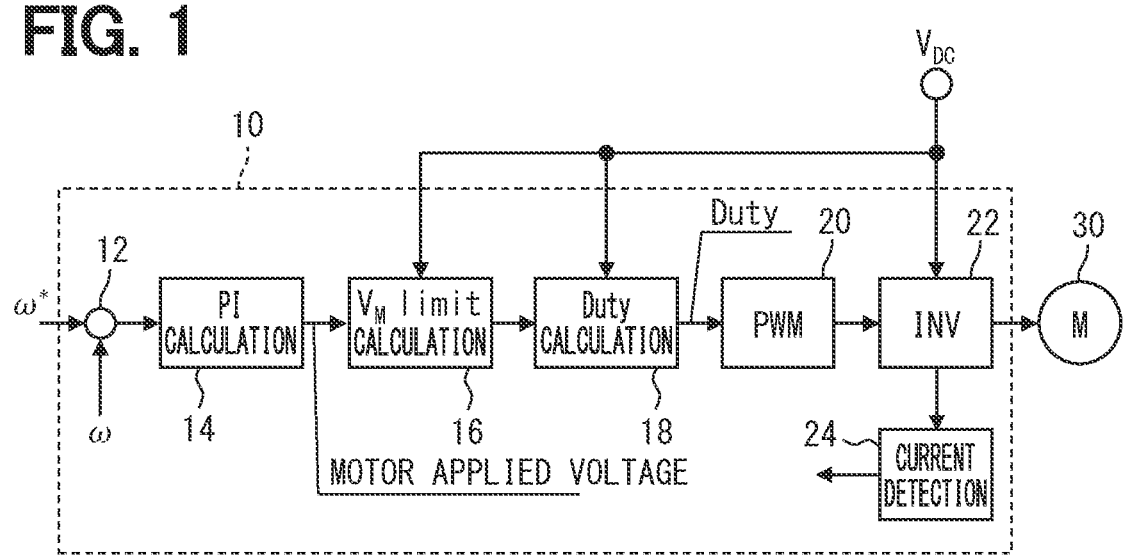
FIG. 1 is a configuration diagram showing a configuration of a motor control device according to a first embodiment.

For example, in the exemplary operating method, when the drive voltage fluctuates, the rotation speed of the motor is adjusted to a speed lower than a speed when there is no voltage fluctuation, so that it is possible to avoid fluctuation, caused by following the fluctuation of the drive voltage, in the rotation speed of the motor.

However, in the exemplary operating method, while the drive voltage is fluctuating (decreasing), the rotation speed of the motor is maintained at a constant low speed, and after a predetermined period of time has elapsed since the power supply voltage returns to a certain level, the speed is increased linearly to the original speed. As a result, the rotation speed of the motor abruptly changes, and the change may make the occupants of the vehicle feel uncomfortable.

In view of the foregoing difficulties, the present disclosure provides a motor control device capable of suppressing fluctuation in a rotation speed of a motor without causing discomfort to an occupant of a vehicle when a power supply voltage for driving the motor fluctuates.

An exemplary embodiment of the present disclosure provides a motor control device that executes fluctuation suppression control when a power supply voltage for driving a motor supplied from a power supply temporarily decreases and then increases to a normal power supply voltage after recovery. The fluctuation suppression control suppresses fluctuation in a rotation speed of the motor which is caused by following fluctuation in the power supply voltage. The motor control device includes a detection unit and a generation unit. The detection unit is configured to detect that the power supply voltage turns to an increase from a decrease. The generation unit is configured to generate, in response to the detection unit detecting that the power supply voltage turns to the increase, an applied voltage to be applied to the motor using a predetermined function such that an actual motor rotation speed decreased according to the decrease of the power supply voltage approaches a target motor rotation speed and an approach speed for which the actual motor rotation speed approaches the target motor rotation speed gradually increases and then gradually decreases over time. The fluctuation suppression control is executed by applying the applied voltage generated by the generation unit to the motor.

In the exemplary embodiment of the present disclosure, with the motor control device according to the present disclosure, the generation unit generates the motor applied voltage that changes smoothly using the predetermined function. Therefore, a sudden change in the motor rotation speed can be suppressed. The motor applied voltage generated by the generation unit is generated such that the actual motor rotation speed, which has decreased due to the decrease in the power supply voltage, gradually increases in speed of approaching the target motor rotation speed over time. In other words, since the initial speed of approach immediately after the power supply voltage turns to an increase is moderate, the fluctuation in the motor rotation speed can be kept small regardless of the fluctuation of the power supply voltage even if the power supply voltage repeatedly fluctuates. In addition, when the power supply voltage returns to the normal voltage and stabilizes, the actual motor rotation speed can quickly approach the target motor rotation speed since the motor applied voltage is generated such that the approach speed gradually increases over time. Furthermore, the motor applied voltage is generated such that the approach speed is gradually decreased after that, so that the actual motor rotation speed can be moderately approximated to the target motor rotation speed.

First Embodiment

A motor control device according to a first embodiment will be described below with reference to the drawings. When a power supply voltage for driving a three-phase motor supplied from a power supply temporarily decreases and then increases to return to a normal power supply voltage, the motor control device according to the present embodiment suppresses fluctuation in a rotation speed of the three-phase motor by following fluctuation in the power supply voltage. Therefore, the three-phase motor controlled by the motor control device according to the present embodiment can be suitably used as a fan motor for rotating a blower fan of an air conditioner of a vehicle, for example. Even when the power supply voltage supplied from an in-vehicle power supply fluctuates, generation of noise due to change in the air volume of the air-conditioning air blown into the passenger compartment can be suppressed if it is possible to suppress fluctuation in a rotation speed of the fan motor, for example. However, the application of the three-phase motor to be controlled by the motor control device according to this embodiment is not limited to the fan motor. That is, the motor control device according to the present embodiment may control various three-phase motors mounted on a vehicle. Also, a three-phase motor used for applications other than vehicles may be controlled. Also, the motor to be controlled may be a motor other than the three-phase motor.

FIG. 1 shows a configuration of a motor control device 10 according to the first embodiment. As shown in FIG. 1, the motor control device 10 includes a deviation calculation unit 12, a PI calculation unit 14, a motor applied voltage upper limit ($V_{M\,limit}$) calculation unit 16 as an upper limit setting unit, a Duty calculation unit 18 as a calculation unit, a PWM drive signal generation unit 20, an inverter 22, a current detection unit 24, and the like. A part of the configuration of the motor control device 10, for example, the PI calculation unit 14, the $V_{M\,limit}$ calculation unit 16, the Duty calculation unit 18, and the like can be configured by a microcomputer having a general configuration including a CPU, a ROM, a RAM, and the like.

The deviation calculation unit 12 calculates a deviation between a target motor rotation speed $\omega^*$ transmitted from a host control device (not shown) and an actual motor rotation speed $\omega$. The calculated deviation is transmitted to the PI calculation unit 14. The PI calculation unit 14 calculates, as a motor applied voltage, a control amount according to the deviation between the target motor rotation speed $\omega^*$ and the actual motor rotation speed $\omega$ by proportional integral control (PI control). By applying this motor applied voltage to a coil of each phase of a three-phase motor through PWM control, the actual motor rotation speed $\omega$ can be approximated to the target motor rotation speed $\omega^*$. Note that the control method for calculating the control amount (motor applied voltage) according to the deviation between the target motor rotation speed $\omega^*$ and the actual motor rotation speed $\omega$ is not limited to PI control, and other control methods (for example, PID control, PD control, or the like) may be used.

Figure 2:
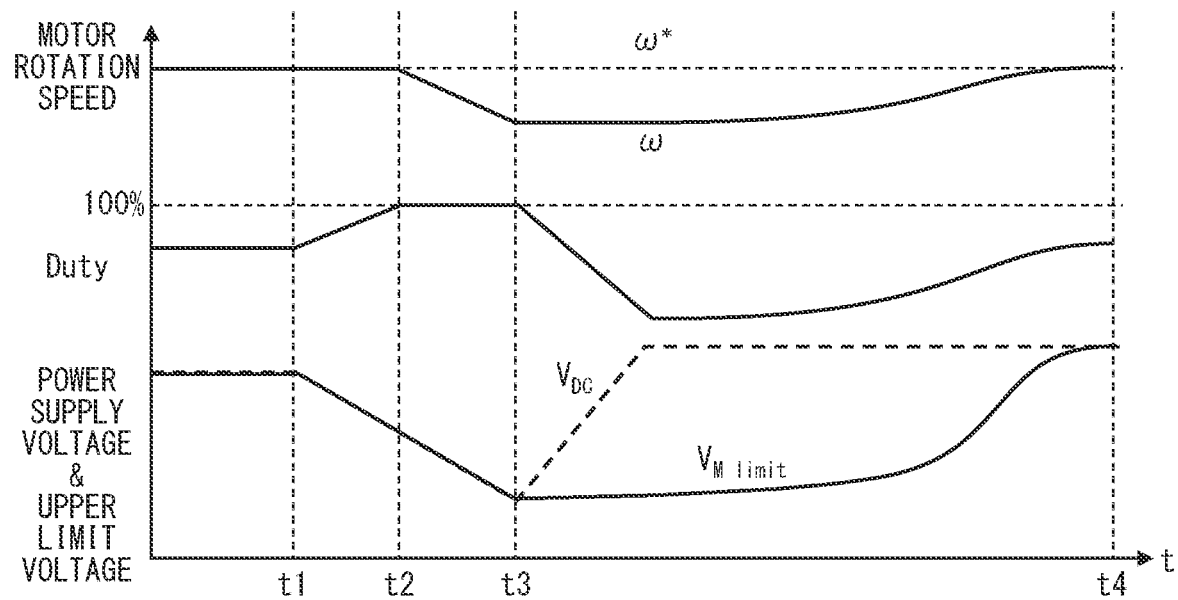
FIG. 2 is a waveform diagram for explaining an operation of the motor control device of FIG. 1.

The $V_{M\,limit}$ calculation unit 16 calculates a motor applied voltage upper limit $V_{M\,limit}$ set as the upper limit voltage to the motor applied voltage calculated by the PI calculation unit 14. As shown in FIG. 2, the $V_{M\,limit}$ calculation unit 16 calculates a voltage equivalent to the power supply voltage $V_{DC}$ as the motor applied voltage upper limit $V_{M\,limit}$ unless the power supply voltage $V_{DC}$ fluctuates (recovery occurs to the original power supply voltage $V_{DC}$ from a temporary drop). For this reason, as shown in FIG. 1, the $V_{M\,limit}$ calculation unit 16 is able to take in the power supply voltage $V_{DC}$, and detect its voltage value. Alternatively, the $V_{M\,limit}$ calculation unit 16 may not set the motor applied voltage upper limit $V_{M\,limit}$ when the power supply voltage $V_{DC}$ does not fluctuate.

However, when an electrical or electronic device that consumes a large amount of power is activated, such as when an electric power steering is used under a heavy load, the power supply voltage $V_{DC}$ supplied from the vehicle battery may temporarily drop. When such fluctuation in the power supply voltage $V_{DC}$ occur, the $V_{M\,limit}$ calculation unit 16, as shown in FIG. 2, calculates the motor applied voltage upper limit $V_{M\,limit}$ that changes so as to approximate the voltage value after recovery from a voltage value at time t3 to a voltage value at time t4. At time t3, the dropped power supply voltage $V_{DC}$ turns to an increase. From time t3 to time t4, the motor applied voltage upper limit $V_{M\,limit}$ is calculated such that an initial increasing speed is moderate, the increasing speed gradually increases, and then the increasing speed gradually decreases.

The motor applied voltage upper limit $V_{M\,limit}$ that changes in this way may be calculated using, for example, a first-order lag transfer function in which the cutoff frequency is a secondary time variable that increases more than the proportional relationship over time. For example, the motor applied voltage upper limit $V_{M\,limit}$ may be expressed by the following Formula 1 using the first-order lag transfer function.

$$V_{M\,limit}(n) = V_{M\,limit}(n-1) + 2\pi FT(V_{DC} - V_{M\,limit}(n-1)) \quad \text{(Formula 1)}$$

In Formula 1, F represents a cutoff frequency and T represents a sampling period. Also, $V_{M\,limit}(n-1)$ represents a previous value of the motor applied voltage upper limit, and $V_{M\,limit}(n)$ represents a present value of the motor applied voltage upper limit.

In the present embodiment, the cutoff frequency F in Formula 1 is calculated as a secondary time variable as shown in Formula 2 below.

$$F = F_0 + F_0 C^2 \quad \text{(Formula 2)}$$

Figure 3:
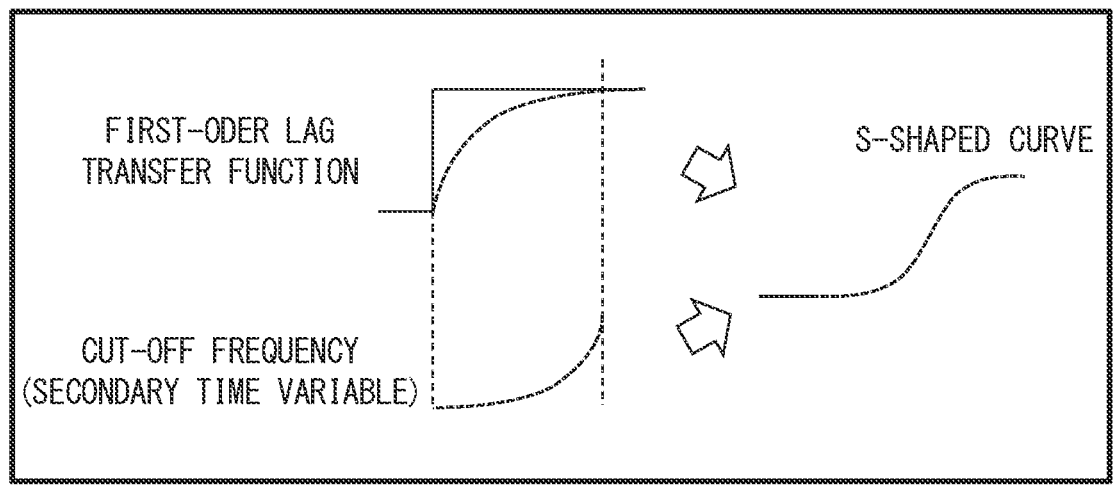
FIG. 3 is an explanatory diagram for explaining a motor applied voltage upper limit $V_{M\ limit}$.

In Formula 2, $F_0$ represents a cutoff frequency initial value, and C represents a cutoff frequency counter. The cutoff frequency counter C starts a counting operation in response to the detection in which the dropped power supply voltage $V_{DC}$ turns to an increase. By squaring the count value of the cutoff frequency counter C and multiplying it by the cutoff frequency initial value $F_0$, the cutoff frequency F calculated by Formula 2 changes so as to increase rapidly over time as shown in FIG. 3.

Figure 4:
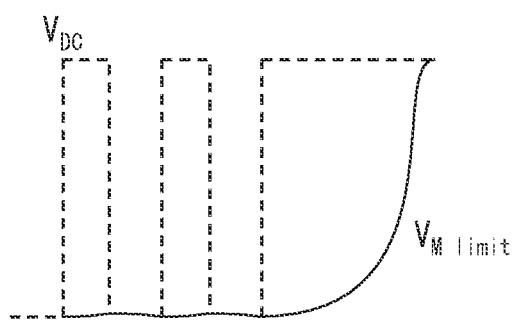
FIG. 4 is a waveform diagram showing change of the motor applied voltage upper limit $V_{M\ limit}$ when a voltage value repeatedly decreases and increases in a case where a dropped power supply voltage $V_{DC}$ returns to an original voltage value.

In this way, the motor applied voltage upper limit $V_{M\ limit}$ is calculated using the first-order lag transfer function in which the cutoff frequency F is set as the secondary time variable. In this configuration, the motor applied voltage upper limit $V_{M\ limit}$ smoothly changes along an S-shaped curve as shown in FIG. 3 by synthesizing a change caused by the first-order lag transfer function and a change caused by the cut-off frequency. That is, the motor applied voltage upper limit $V_{M\ limit}$ is smoothly changed over time such that the initial increasing speed is moderate, the increasing speed gradually increases, and then the increasing speed gradually decreases. The initial increasing speed is moderate. Thus, for example, as shown in FIG. 4, if the voltage repeats increasing and decreasing in a case where the dropped power supply voltage $V_{DC}$ returns to the normal power supply voltage, the fluctuation of the motor applied voltage upper limit $V_{M\ limit}$ can be kept small. Therefore, by applying the voltage corresponding to the motor applied voltage upper limit $V_{M\ limit}$ to the coil of each phase of the three-phase motor, even if the power supply voltage $V_{DC}$ repeatedly fluctuates, the fluctuation in the motor rotation speed $\omega$ can be kept small.

In the above description, an example has been explained in which the motor applied voltage upper limit $V_{M\ limit}$ is calculated using the first-order lag transfer function in which the cutoff frequency F is set as the secondary time variable. However, the motor applied voltage upper limit $V_{M\ limit}$ may be calculated using another function. For example, in order to calculate the motor applied voltage upper limit $V_{M\ limit}$, a first-order lag transfer function with the cutoff frequency F as a third-order time variable may be used. Furthermore, the motor applied voltage upper limit $V_{M\ limit}$ that changes in an S-shape may be calculated using an exponential function or a sigmoid function. In any case, by calculating the motor applied voltage upper limit $V_{M\ limit}$ using a predetermined function, the $V_{M\ limit}$ calculation unit 16 calculates the motor applied voltage upper limit $V_{M\ limit}$ that changes smoothly in an S-shape.

The $V_{M\ limit}$ calculation unit 16 transmits the calculated motor applied voltage upper limit $V_{M\ limit}$ to the Duty calculation unit 18 from time t3 to t4. At time t3, it is detected that the dropped power supply voltage $V_{DC}$ turns to an increase. At time t4, the calculated motor applied voltage upper limit $V_{M\ limit}$ approximates the power supply voltage $V_{DC}$ (or the actual motor rotation speed $\omega$ is approximated to the target motor rotation speed $\omega^*$). For other periods, the $V_{M\ limit}$ calculation unit 16 transmits the motor applied voltage calculated by the PI calculation unit 14 to the Duty calculation unit 18. Alternatively, when the motor applied voltage calculated by the PI calculation unit 14 is greater than the motor applied voltage upper limit $V_{M\ limit}$, the $V_{M\ limit}$ calculation unit 16 may transmit the motor applied voltage upper limit $V_{M\ limit}$ to the Duty calculation unit 18, and when the motor applied voltage calculated by the PI calculation unit 14 is equal to or smaller than the motor applied voltage upper limit $V_{M\ limit}$, the $V_{M\ limit}$ calculation unit 16 may transmit the motor applied voltage calculated by the PI calculation unit 14 to the Duty calculation unit 18.

The Duty calculation unit 18 calculates the PWM duty based on the motor applied voltage or the motor applied voltage upper limit $V_{M\ limit}$ transmitted from the $V_{M\ limit}$ calculation unit 16, and the power supply voltage $V_{DC}$. For example, the Duty calculation unit 18 may calculate the PWM duty corresponding to the ratio of the magnitude of the motor applied voltage or the motor applied voltage upper limit $V_{M\ limit}$ to the magnitude of the power supply voltage $V_{DC}$. Therefore, for example, when the $V_{M\ limit}$ calculation unit 16 transmits the motor applied voltage upper limit $V_{M\ limit}$ to the Duty calculation unit 18, the Duty calculation unit 18 calculates the PWM duty in order to apply an applied voltage corresponding to the motor applied voltage upper limit $V_{M\ limit}$ to the coil of each phase of the three-phase motor 30. The PWM duty calculated by the Duty calculation unit 18 is transmitted to the PWM drive signal generation unit 20.

The PWM drive signal generation unit 20 generates a PWM drive signal having a pulse width corresponding to the PWM duty calculated by the duty calculator 18, and outputs the PWM drive signal to the inverter 22. The inverter 22 converts DC power from an in-vehicle battery (not shown), which is a DC power supply, into AC power, and supplies the AC power to the three-phase motor 30. The inverter 22 has three-phase legs connected in parallel between the positive and negative terminals of the vehicle battery. The leg of each phase includes multiple switching elements (for example, IGBTs, MOSFETs, or the like) connected in series. The switching elements provided in the leg of each phase of the inverter 22 are PWM-controlled according to the PWM drive signal generated by the PWM drive signal generation unit 20, thereby converting the DC power supplied from the in-vehicle battery into AC power, and being supplied to the three-phase motor 30. At this time, the motor applied voltage calculated by the PI calculation unit 14 or the voltage corresponding to the motor applied voltage upper limit $V_{M\ limit}$ calculated by the $V_{M\ limit}$ calculation unit 16 is applied to the coil of each phase of the three-phase motor 30.

The current detection unit 24 detects a current based on an induced voltage generated in the coil of each phase by switching the coil to be energized in the three-phase motor 30. Thus, the actual rotational speed $\omega$ of the three-phase motor 30 can be calculated by detecting the current based on the induced voltage generated in the coil of each phase. The actual rotation speed $\omega$ of the three-phase motor 30 may be calculated in the current detection unit 24, or may be calculated in a configuration, which is separate from the current detection unit 24, based on the detected current. Alternatively, a position sensor that detects the rotational position of the three-phase motor 30 may be used to detect the actual rotational speed $\omega$ of the three-phase motor 30.

Next, an example of processing contents of fluctuation suppression control will be described with reference to the flowchart of FIG. 5. In the fluctuation suppression control, when a power supply voltage $V_{DC}$ temporarily decreases and then increases to return to a normal power supply voltage $V_{DC}$, the motor control device 10 according to the present embodiment suppresses fluctuation, caused by following the fluctuation in the power supply voltage $V_{DC}$, in the rotation speed of the three-phase motor 30.

In step S100, the motor rotation speed is PI-controlled according to the target motor rotation speed $\omega^*$. As a result, the actual rotation speed $\omega$ of the three-phase motor 30 is controlled so as to follow the target motor rotation speed $\omega^*$. With such control, for example, as shown in FIG. 2, even if a temporary drop in the power supply voltage $V_{DC}$ starts at time t1, the actual motor rotation speed $\omega$ is maintained at the target motor rotation speed $\omega^*$ until time t2.

Here, from time t1 to time t2 in FIG. 2, the PWM duty is increased in order to maintain the actual motor rotation speed $\omega$ at the target motor rotation speed $\omega^*$ regardless of the decrease in the power supply voltage $V_{DC}$. However, at time t2, the PWM duty reaches 100% and cannot be increased any further. Therefore, after time t2, the actual motor rotation speed $\omega$ cannot be maintained at the target motor rotation speed $\omega^*$ by the PI control, and the actual motor rotation speed ω will also decreases as the power supply voltage $V_{DC}$ decreases.

At time t3 in FIG. 2, when the decreased power supply voltage $V_{DC}$ turns to an increase, the PWM duty decreases from 100% to a value less than 100%. In step S110 of the flowchart of FIG. 5, after the power supply voltage $V_{DC}$ temporarily drops and the PWM duty becomes 100%, it is determined that the PWM duty drops from 100% to a value less than 100% (for example, 98%). That is, in step S110, it is determined that the decreased power supply voltage $V_{DC}$ turned to an increase based on the change in the PWM duty. Alternatively, whether or not the power supply voltage $V_{DC}$ turns to an increase may be determined directly from the change in the power supply voltage $V_{DC}$. When the determination result in step S110 is "Yes", the process proceeds to step S120. On the other hand, when the determination result in step S110 is "No", the process returns to step S100.

In step S120, immediately following the increase in the power supply voltage $V_{DC}$, the rotation speed of the three-phase motor 30 rapidly increases. As a result, the fluctuation suppression control that suppresses the fluctuation in the rotation speed of the three-phase motor 30 according to the fluctuation in the power supply voltage $V_{DC}$. Specifically, in step S120, the cutoff frequency counter C starts counting.

In step S130, it is determined whether or not the motor applied voltage upper limit $V_{M\ limit}$ calculated in the fluctuation suppression control has become equal to or higher than the power supply voltage $V_{DC}$ restored to the original voltage value. When the determination result in step S130 is "Yes", the process proceeds to step S170 since it is no longer necessary to continue the fluctuation suppression control. On the other hand, when the determination result in step S130 is "No", the process proceeds to step S140 in order to continue execution of the fluctuation suppression control. In step S130, additionally or alternatively, it may be determined that the actual motor rotation speed ω is equal to or greater than the target motor rotation speed ω*.

In step S140, the motor applied voltage upper limit $V_{M\ limit}$ is calculated by using the predetermined function from the voltage value at time t3 at which the dropped power supply voltage $V_{DC}$ turns to an increase to the voltage value of the power supply voltage $V_{DC}$ after recovery such that the initial increasing speed is moderate, the increasing speed gradually increases, the increasing speed gradually decreases, and then the motor applied voltage upper limit $V_{M\ limit}$ approximates to the voltage value after recovery at time t4. Note that the motor applied voltage calculation process in step S140 is repeatedly executed until it is determined, in step S130, that the motor applied voltage upper limit $V_{M\ limit}$ is equal to or higher than the power supply voltage $V_{DC}$. In each motor applied voltage calculation process in step S140, which is repeated as described above, a different motor applied voltage upper limit $V_{M\ limit}$ is calculated since the count value of the cutoff frequency counter C, the power supply voltage $V_{DC}$, and the previous value of the motor applied voltage upper limit $V_{M\ limit}$ change each time the process is executed. Thus, the motor applied voltage upper limit $V_{M\ limit}$ is changed along an S-shaped curve.

In step S150, the PWM duty for applying an applied voltage corresponding to the motor applied voltage upper limit $V_{M\ limit}$ to the coil of each phase of the three-phase motor 30 is calculated. The calculated PWM duty is output to the PWM drive signal generation unit 20 in step S160.

In step S170, the fluctuation suppression control is terminated. At this timing, the count operation of the cutoff frequency counter C is stopped. Then, in step S180, the count value of the cutoff frequency counter C is cleared. After that, the processing shown in the flowchart of FIG. 5 is terminated.

As described above, the motor control device 10 according to the present embodiment calculates the motor applied voltage upper limit $V_{M\ limit}$ that changes smoothly, using a predetermined function, from the voltage value at time t3 at which the dropped power supply voltage $V_{DC}$ turns to an increase to the voltage value of the power supply voltage $V_{DC}$ after recovery. Then, an applied voltage corresponding to the calculated motor applied voltage upper limit $V_{M\ limit}$ is applied to the coil of each phase of the three-phase motor 30. Therefore, a sudden change in the actual motor rotation speed ω can be suppressed.

The motor applied voltage upper limit $V_{M\ limit}$ is generated such that the actual motor rotation speed ω, which has decreased due to the decrease in the power supply voltage $V_{DC}$, gradually increases in speed of approaching the target motor rotation speed ω* over time. In other words, since the initial speed of approach immediately after the power supply voltage $V_{DC}$ turns to an increase is moderate, the fluctuation in the actual motor rotation speed ω can be kept small regardless of the fluctuation of the power supply voltage $V_{DC}$ even if the power supply voltage $V_{DC}$ repeatedly fluctuates.

Further, when the power supply voltage $V_{DC}$ returns to a normal voltage value and stabilizes, the motor applied voltage upper limit $V_{M\ limit}$ is set such that the actual motor rotation speed ω gradually increases in speed of approaching the target motor rotation speed ω* over time. Therefore, the actual motor rotation speed ω can be quickly brought closer to the target motor rotation speed ω*. Furthermore, after that, the motor applied voltage upper limit $V_{M\ limit}$ is generated such that the approach speed is gradually decreased, so that the actual motor rotation speed ω can be moderately approximated to the target motor rotation speed ω*.

Second Embodiment

A motor control device according to a second embodiment of the present disclosure will be described below with reference to the drawings. The motor control device 10 according to the first embodiment described above suppresses the fluctuation of the actual motor rotation speed ω by setting the motor applied voltage upper limit $V_{M\ limit}$ that is the upper limit for the motor applied voltage when the decreased power supply voltage $V_{DC}$ rises.

On the other hand, a motor control device 110 according to the second embodiment suppresses the fluctuation of the actual motor rotation speed ω, when the decreased power supply voltage $V_{DC}$ rises, by setting a transient target motor rotation speed $n_{trgt}$ that changes from the actual motor rotation speed ω when the power supply voltage $V_{DC}$ turns to an increase to the target motor rotation speed ω* such that an increasing speed of the motor rotation speed ω gradually increases, and then the increasing speed gradually decreases. The motor control device according to the second embodiment will be described below, focusing on differences from the motor control device 10 according to the first embodiment.

Figure 6:
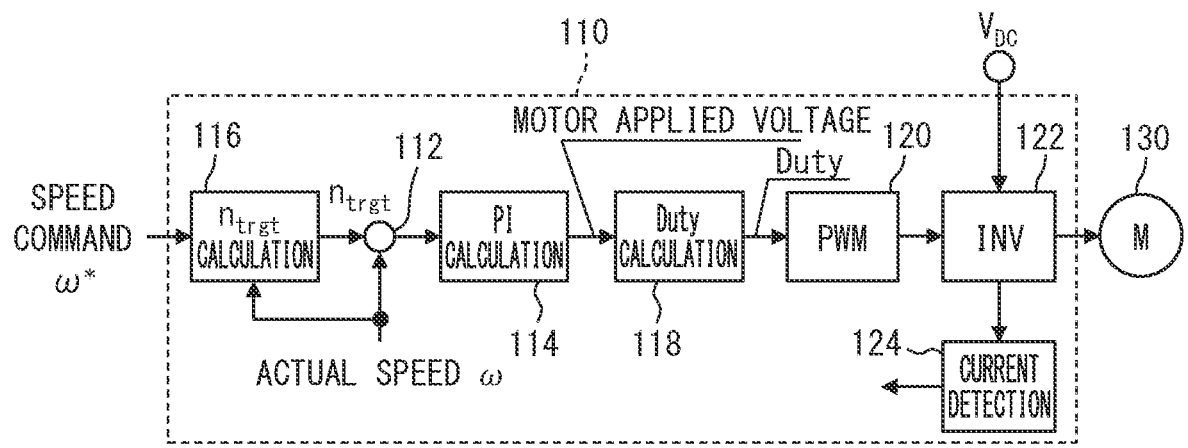
FIG. 6 is a configuration diagram showing a configuration of a motor control device according to a second embodiment.

As shown in FIG. 6, the motor control device 110 according to the present embodiment includes a transient target motor rotation speed ($n_{trgt}$) calculation unit 116 as a transient target setting unit instead of the $V_{M\ limit}$ calculation unit 16 of the motor control device 10 according to the first embodiment.

Figure 7:
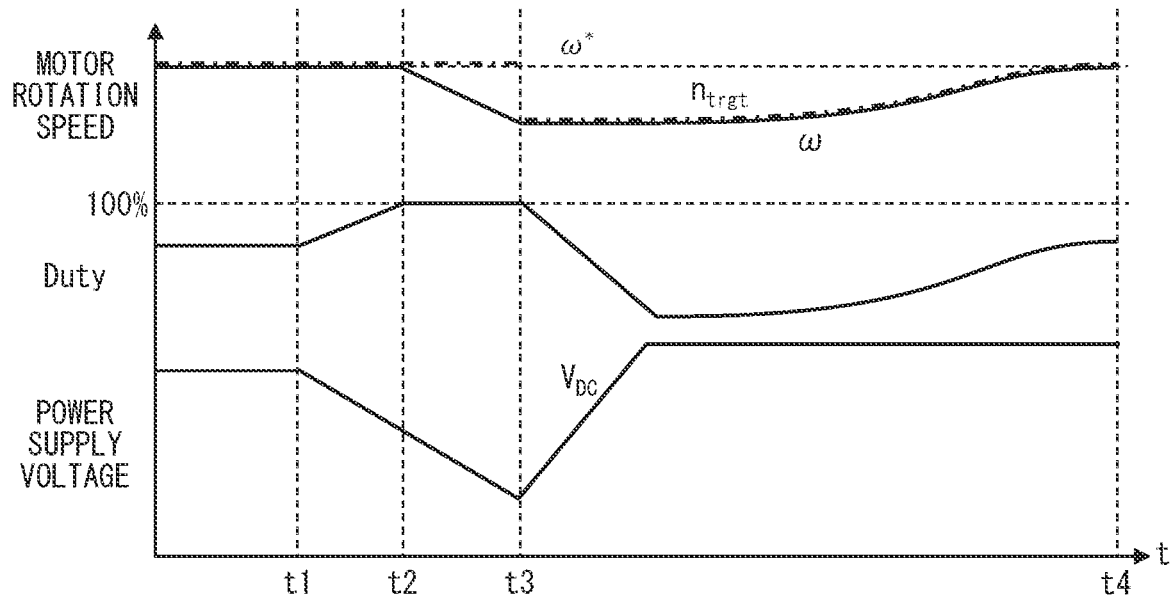
FIG. 7 is a waveform diagram for explaining an operation of the motor control device of FIG. 6.

As long as the power supply voltage $V_{DC}$ does not fluctuate (that is, a recover does not occur from a temporary drop to the original power supply voltage $V_{DC}$), the $n_{trgt}$ calculation unit 116 sets, as the transient target motor rotation speed $n_{trgt}$, a rotation speed equal to the target motor rotation speed $\omega^*$ as shown by a dash-dot line in FIG. 7. Alternatively, when the actual motor rotation speed $\omega$ begins to decrease at time t2 in FIG. 7 even though the PWM duty is 100%, the $n_{trgt}$ calculation unit 116 may set the transient target motor rotation speed $n_{trgt}$ so as to follow the decrease in the actual motor rotation speed $\omega$. Further, the $n_{trgt}$ calculation unit 116 may not set the transient target motor rotation speed $n_{trgt}$ until the power supply voltage $V_{DC}$ temporarily decreases and then the decreased power supply voltage $V_{DC}$ turns to an increase.

The power supply voltage $V_{DC}$ may fluctuate such as temporarily decreasing and then returning to the original power supply voltage $V_{DC}$. In this case, as shown in FIG. 7, the $n_{trgt}$ calculation unit 116 calculates the transient target motor rotation speed $n_{trgt}$ using the predetermined function from an actual motor rotation speed $\omega$ at time t3 at which the dropped power supply voltage $V_{DC}$ turns to an increase to the target motor rotation speed $\omega^*$ such that the initial increasing speed is moderate, the increasing speed gradually increases, the increasing speed gradually decreases, and then the motor rotation speed $\omega$ approximates to the target motor rotation speed $\omega^*$ at time t4.

As the predetermined function used to calculate the transient target motor rotation speed $n_{trgt}$, similarly to the faction in the first embodiment, a first-order lag transfer function in which a cutoff frequency F is set as a secondary time variable, a first-order lag transfer function in which a cutoff frequency F is set as a third-order time variable, an exponential function, a sigmoid function, or the like can be used.

At least from time t3 to time t4 in FIG. 7, the PI calculation unit 114 calculates, as the motor applied voltage, a control amount according to a deviation between the actual motor rotation speed $\omega$ and the transitional target motor rotation speed $n_{trgt}$. The Duty calculation unit 118 calculates a PWM duty corresponding to the ratio of the magnitude of the motor applied voltage calculated by the PI calculation unit 114 to the magnitude of the power supply voltage $V_{DC}$. As a result, as shown in FIG. 7, during the period from time t3 to time t4, regardless of whether the power supply voltage $V_{DC}$ returns to the original voltage value, the voltage applied to the coil of each phase of the three-phase motor 130 can be controlled such that the actual motor rotation speed $\omega$ changes in an S-shape by following the transient target motor rotation speed $n_{trgt}$. As a result, even with the motor control device 110 according to the present embodiment, it is possible to obtain the same effects as those described in the first embodiment when a power supply voltage $V_{DC}$ temporarily decreases and then increases to return to a normal power supply voltage $V_{DC}$.

Next, an example of processing contents of fluctuation suppression control will be described with reference to the flowchart of FIG. 8. In the fluctuation suppression control, when a power supply voltage $V_{DC}$ temporarily decreases and then increases to return to a normal power supply voltage $V_{DC}$, the motor control device 110 according to the present embodiment suppresses fluctuation in the rotation speed of the three-phase motor 30 by following the fluctuation in the power supply voltage $V_{DC}$.

Figure 5:
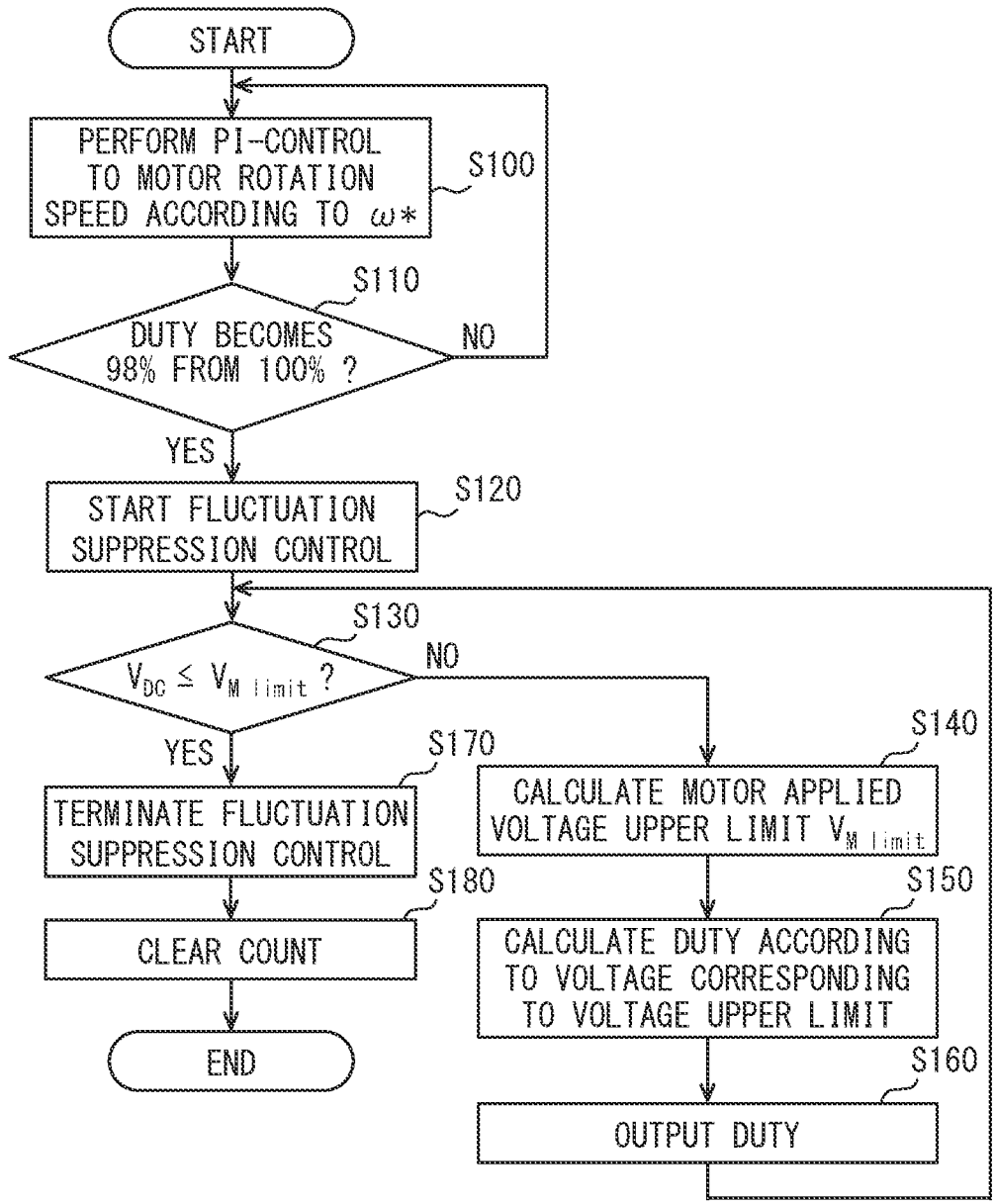
FIG. 5 is a flowchart showing processing details of variation suppression control that is performed by the motor control device according to the first embodiment, and suppresses fluctuation, by following fluctuation in the power supply voltage $V_{DC}$, in the rotation speed of a three-phase motor.

Steps S200 to S220 and steps S270 to S280 are similar to steps S100 to S120 and steps S170 to S180 in the flowchart of FIG. 5, so description thereof will be omitted.

In step S230, it is determined whether or not the transient target motor rotation speed $n_{trgt}$ calculated in the variation suppression control matches with the target motor rotation speed $\omega^*$ transmitted from the host control device. In this determination process, since the actual motor rotation speed $\omega$ changes according to the transient target motor rotation speed $n_{trgt}$, it may be determined whether or not the actual motor rotation speed $\omega$ matches with the target motor rotation speed $\omega^*$. When the determination result in step S230 is "Yes", the process proceeds to step S270 since it is no longer necessary to continue the fluctuation suppression control. On the other hand, when the determination result in step S230 is "No", the process proceeds to step S240 in order to continue execution of the fluctuation suppression control.

In step S240, using the predetermined function, the transient target motor rotation speed $n_{trgt}$ is calculated so as to change from an actual motor rotation speed w at time t3 at which the dropped power supply voltage $V_{DC}$ turns to an increase to the target motor rotation speed $\omega^*$ such that the initial increasing speed is moderate, the increasing speed gradually increases, the increasing speed gradually decreases, and then the motor rotation speed $\omega$ approximates to the target motor rotation speed $\omega^*$ at time t4. Note that the transient target motor rotation speed $n_{trgt}$ is repeatedly calculated in step S240 until the determination result in step S230 becomes "Yes", which is the same as the calculation of the motor applied voltage upper limit $V_{M\ limit}$ in the first embodiment.

In step S250, a PWM duty for applying a motor applied voltage corresponding to the deviation between the transient target motor rotation speed $n_{trgt}$ and the actual motor rotation speed $\omega$ to the coil of each phase of the three-phase motor 130 is calculated. Then, in step S260, the calculated PWM duty is output to the PWM drive signal generation unit 120.

There have been described the preferred embodiments of the present disclosure. However, the present disclosure is not limited to the above-mentioned embodiments. However, the disclosure may be otherwise variously modified within the spirit and scope of the disclosure.

For example, the motor control units 10, 110 and methods thereof described in the present disclosure may be implemented by a special purpose computer which is configured with a memory and a processor programmed to execute one or more particular functions embodied in computer programs of the memory. Alternatively, the motor control units 10, 110 and methods thereof according to the present disclosure may be achieved by a dedicated computer provided by constituting a processor with one or more dedicated hardware logic circuits. Alternatively, the motor control units 10, 110 and methods thereof described in the present disclosure may be implemented by one or more special purpose computer, which is configured as a combination of a processor and a memory, which execute computer programs and are programmed to perform one or more functions, and a processor which is configured with one or more hardware logic circuits. The computer program may be stored, as instructions to be executed by a computer, in a tangible non-transitory computer-readable medium.

What is claimed is:

1. A motor control device that executes fluctuation suppression control when a power supply voltage for driving a motor supplied from a power supply temporarily decreases and then increases to a normal power supply voltage after recovery, and the fluctuation suppression control suppressing fluctuation in a rotation speed of the motor which is caused by following fluctuation in the power supply voltage, the motor control device comprising:

a detection unit configured to detect that the power supply voltage turns to an increase from a decrease; and a generation unit configured to generate, in response to the detection unit detecting that the power supply voltage turns to the increase, an applied voltage to be applied to the motor using a predetermined function such that (i) an actual motor rotation speed decreased according to the decrease of the power supply voltage approaches a target motor rotation speed, and (ii) an initial increasing speed of the actual motor rotation speed is moderate, an increasing speed of the actual motor rotation speed gradually increases, and then the increasing speed gradually decreases over time, wherein the fluctuation suppression control is executed by applying the applied voltage generated by the generation unit to the motor, and the predetermined function is a transfer function of a first-order lag system including a cutoff frequency that increases more than a proportional relationship over time.

2. The motor control device according to claim 1, wherein the motor is PWM-controlled via an inverter, and the generation unit includes:

an upper limit setting unit configured to set a motor applied voltage upper limit, using the predetermined function, so as to change from the power supply voltage when turning to the increase to the normal power supply voltage after recovery such that an initial increasing speed of the applied voltage is moderate, an increasing speed of the applied voltage gradually increases, and then the increasing speed gradually decreases over time;

a calculation unit configured to calculate a PWM duty for applying to the motor the applied voltage corresponding to the motor applied voltage upper limit set by the upper limit setting unit, regardless of the increase in the power supply voltage; and a driving unit configured to drive the inverter according to the PWM duty calculated by the calculation unit.

3. The motor control device according to claim 2, wherein in a case where the actual motor rotation speed is lower than the target motor rotation speed although the PWM duty is 100% and then the PWM duty is reduced from 100% to less than 100%, the detection unit detects that the power supply voltage turns to the increase from the decreases.

4. The motor control device according to claim 2, wherein when the motor applied voltage upper limit set by the upper limit setting unit becomes equal to or higher than the power supply voltage after recovery, the fluctuation suppression control is terminated.

5. The motor control device according to claim 1, wherein the motor is PWM-controlled via an inverter, and the generation unit includes:

a transient target setting unit configured to set a transient target motor rotation speed, using the predetermined function, so as to change from the actual motor rotation speed when turning to the increase to the target motor rotation speed such that an initial increasing speed of the actual motor rotation speed is moderate, an increasing speed of the actual motor rotation speed gradually increases, and then the increasing speed gradually decreases;

a calculation unit configured to calculate a PWM duty for changing the actual motor rotation speed by following the transient target motor rotation speed set by the transient target setting unit, regardless of the increase in the power supply voltage; and a driving unit configured to drive the inverter according to the PWM duty calculated by the calculation unit.

6. The motor control device according to claim 5, wherein when the transient target motor rotation speed set by the transient target setting unit matches with the target motor rotation speed, the fluctuation suppression control is terminated.

7. A motor control device comprising a processor configured to:

detect, when a power supply voltage for driving a motor supplied from a power supply fluctuates so as to temporarily decrease and then increase to a normal power supply voltage after recovery, that the power supply voltage turns to an increase from a decrease;

generate, in response to the power supply voltage turning to the increase, an applied voltage to be applied to the motor using a predetermined function such that (i) an actual motor rotation speed decreased according to the decrease of the power supply voltage approaches a target motor rotation speed, and (ii) an initial increasing speed of the actual motor rotation speed is moderate, an increasing speed of the actual motor rotation speed gradually increases, and then the increasing speed gradually decreases over time; and execute, by applying the applied voltage to the motor, fluctuation suppression control to suppress fluctuation in a rotation speed of a motor which is caused by following fluctuation in the power supply voltage, wherein the predetermined function is a transfer function of a first-order lag system including a cutoff frequency that increases more than a proportional relationship over time.

* * * * *